United States Patent
Du et al.

(10) Patent No.: US 8,358,216 B2
(45) Date of Patent: Jan. 22, 2013

(54) LIQUID LEVEL DETECTING DEVICE AND SAMPLE APPLYING SYSTEM

(75) Inventors: Peng Du, Shenzhen (CN); Yueping Chen, Shenzhen (CN); Yanwen Weng, Shenzhen (CN)

(73) Assignee: Shenzhen Mindray Bio-Medical Electronics Co., Ltd., Nanshan, Shenzhen (CN)

( * ) Notice: Subject to any disclaimer, the term of this patent is extended or adjusted under 35 U.S.C. 154(b) by 320 days.

(21) Appl. No.: 12/756,870

(22) Filed: Apr. 8, 2010

(65) Prior Publication Data
US 2010/0259397 A1 Oct. 14, 2010

(30) Foreign Application Priority Data

Apr. 9, 2009 (CN) .......................... 2009 1 0106574

(51) Int. Cl.
*G08B 21/00* (2006.01)

(52) U.S. Cl. ........ 340/618; 340/612; 340/613; 340/619; 340/620

(58) Field of Classification Search ............... 340/304, 340/501, 511, 562, 564, 602–626; 173/1; 702/55
See application file for complete search history.

(56) References Cited

U.S. PATENT DOCUMENTS

| | | | | |
|---|---|---|---|---|
| 4,912,976 A * | 4/1990 | Labriola, II | ............... | 73/290 R |
| 5,365,783 A * | 11/1994 | Zweifel | ........................ | 73/304 C |
| 5,493,922 A * | 2/1996 | Ramey et al. | .............. | 73/863.02 |
| 5,539,386 A * | 7/1996 | Elliott | ............................ | 340/632 |
| 5,648,727 A | 7/1997 | Tyberg et al. | | |
| 5,866,426 A * | 2/1999 | Ball | ................................ | 436/54 |
| 6,107,810 A * | 8/2000 | Ishizawa et al. | .............. | 324/662 |
| 7,665,358 B2 * | 2/2010 | Calabrese | ................... | 73/304 R |
| 2007/0137315 A1* | 6/2007 | Harazin et al. | ............. | 73/863.02 |
| 2007/0144253 A1* | 6/2007 | Kobayashi | .................. | 73/304 C |

FOREIGN PATENT DOCUMENTS

| | | |
|---|---|---|
| CN | 2588334 | 11/2003 |
| CN | 101135584 | 3/2008 |
| CN | 201184810 | 1/2009 |
| EP | 0819942 A2 | 1/1998 |
| JP | 06265508 A * | 9/1994 |

OTHER PUBLICATIONS

Design of a Photoelectric Liquid Level Detecting Circuit in a Blood Viscosity Tester, Publication Date: 1998 vol. 2.

(Continued)

*Primary Examiner* — Daniel Wu
*Assistant Examiner* — Vishak Ganesh
(74) *Attorney, Agent, or Firm* — Vista IP Law Group, LLP

(57) ABSTRACT

Various embodiments disclose a liquid level detecting device and method, which comprises: a control unit configured to output control instructions corresponding to environmental information according to the environmental information of a location of a sampling needle; an amplifying unit configured to set a gain according to the control instructions; a converting unit configured to receive and convert a capacitance signal from the sampling needle to a voltage signal; the amplifying unit receives the voltage signal and amplifies the voltage signal according to the gain; the control unit receives the amplified voltage signal and compares the amplified voltage signals with a preset voltage threshold to determine whether the sampling needle contacts the liquid level. Some embodiments further disclose a sample application system. Various embodiments consider both sensitivity and reliability of a detection system and is adaptable to various detection environments.

20 Claims, 4 Drawing Sheets

OTHER PUBLICATIONS

English Abstract of CN2588334, Filing Date: Dec. 27, 2002 Issuance Date: Nov. 26, 2003.
English Abstract of CN101135584, Filing Date: Dec. 27, 2002 Issuance Date: Nov. 26, 2003.
English Abstract of CN201184810, Filing Date: Dec. 27, 2002 Issuance Date: Nov. 26, 2003.
English Abstract of "Design of a Photoelectric Liquid Level Detecting Circuit in a Blood Viscosity Tester", Publication Date: 1998 vol. 2.
International Search Report for Chinese Patent Application No. 200910106574.6, CN Search Report Date: Aug. 27, 2009.

* cited by examiner

LIQUID LEVEL DETECTING DEVICE AND SAMPLE APPLYING SYSTEM

CROSS-REFERENCE TO RELATED APPLICATIONS

This application claims priority to Chinese Patent Application No. 200910106574.6, filed on Apr. 9, 2009, which is hereby incorporated by reference in its entirety.

FIELD OF INVENTION

Various embodiments relate to a methods and apparatus of a sample applying system. Some embodiments are directed at a liquid level detecting device in a sample applying system.

BACKGROUND

In the field of medicine, a sample applying system or a sampling system (hereinafter a sampling system) is often needed for sampling and for adding and/or pipetting samples and/or reaction solution. In a sample applying system, the location of the sampling needle is positioned based at least in part on the detection of the liquid level. That is, the sampling system preferably stops advancing the sampling needle or device when the sampling needle contacts the object liquid level so as to carry out the next task. This function may be realized by a liquid level detecting device.

The liquid level detecting device converts capacitance change in the sampling needle into voltage or potential change and determines whether the sampling needle contacts the liquid level based at least in part on this change in capacitance. In operation, because different specific conditions of detecting positions may have different manner or magnitude of influences on the capacitance change of the sampling needle, detection results often vary as well. For example, when the sampling needle enters an environment such as a metal container, the capacitance change of the sampling needle itself is relatively apparent and thus tends to lead to incorrect detection of the liquid level. Whereas in the case of a plastic container or when the container contains relatively little amount of liquid, the capacitance change of the sampling needle is relatively weak or insignificant in comparison to the change in capacitance due to the contact with the liquid surface and thus may result in a lowered sensitivity in detection. This lowered sensitivity in detection of the liquid level often leads to a scenario that no result may be obtained quickly even when the sampling needle has indeed contacted the liquid level.

For sampling systems, particularly sampling systems utilizing the liquid level detecting device, it is desired that the sampling system may both detect liquid level with high sensitivity and avoid incorrect detection in an environment where the container or the amount of liquid in the container may skew the detection. However, it is difficult for conventional liquid level detecting devices to meet such requirements because these conventional liquid level detection devices tend to cause errors in test results when it is needed to perform detection under various complex environments.

SUMMARY OF THE INVENTION

Various embodiments are directed at a liquid level detecting device that is characterized by being capable of adapting to different detection environments with high sensitivity and reliability.

In some embodiments, a liquid level detecting device includes a control unit configured to output control instructions corresponding to environmental information according to at least the environmental information of a location of a sampling needle; an optional amplifying unit configured to set a gain according to the control instructions; a converting unit configured to receive a capacitance signal from the sampling needle and output a corresponding voltage signal after conversion, wherein the optional amplifying unit receives the corresponding voltage signal and optionally amplifies the voltage signal according to the set gain to output the amplified voltage signal, and the control unit receives the optionally amplified voltage signal and determines whether the sampling needle contacts the liquid level according to the optional amplified voltage signal.

Some embodiments are directed at a liquid level detecting method, which includes:
  determining an environment in which a sampling needle is located;
  setting a gain according to the environmental information of the environment in which the sampling needle is located;
  optionally amplifying a liquid level signal from the sampling needle according to the set gain;
  determining whether the sampling needle contacts the liquid level based at least in part upon the amplified liquid level signal.

Various embodiments also provide a sample applying system which includes a sampling needle and a liquid level detecting device, wherein the sampling needle is configured to detect a liquid level and generates a changed capacitance value after contacting the liquid level, and the converting unit of the liquid level detecting device is connected with the sampling needle.

DETAILED DESCRIPTION OF THE EMBODIMENTS

Various embodiments will hereinafter be further described in details by specific implementations with reference to the drawings.

In some embodiments, the liquid level detecting device sets the gain factor of the amplifying unit according to the environment where the sampling needle locates or operates, optionally amplifies liquid level signals from the sampling needle according to the set gain, and then determines whether the sampling needle contacts the surface based at least in part upon the optionally amplified liquid level signals.

In some embodiments where the environment that the sampling needle is located or operates exhibits an influence, which exceeds a predetermined threshold level, on the capacitance of the sampling needle and thereby renders the change in the capacitance of the sampling needle significant, the gain of the amplifying unit may be lowered to a predetermined level to determine whether the sampling needle detects the liquid level while ensuring sensitivity, in order to prevent the sampling needle from generating less than desired detection of the liquid level when the sampling needle has not actually contacted the liquid level. In some embodiments where the environment in which the sampling needle is located or operates exhibits certain influence, which is less than a predetermined threshold level, on the capacitance of the sampling needle and thereby renders the change in the capacitance of sampling needle insignificant so as to cause incorrect detection of the liquid level, the gain of the amplifying unit may be increased by a predetermined level to determine whether the sampling needle actually contacts the liquid surface or whether the liquid surface detection device correctly detects the liquid level while ensuring reliability in the detection in order to avoid system failure in determining that the sampling needle has contacted the liquid level. In these embodiments, by setting gains corresponding to the environment where the sampling needle operates or is located, the liquid level detecting device may accommodate both sensitivity in its detection of the liquid level and reliability in the detection results of the detection system. In these embodiments, the liquid level detecting device may be adapted to various detection environments which exhibits different levels of influence on the sensitivity and/or reliability of the liquid level detection device.

Figure 1:
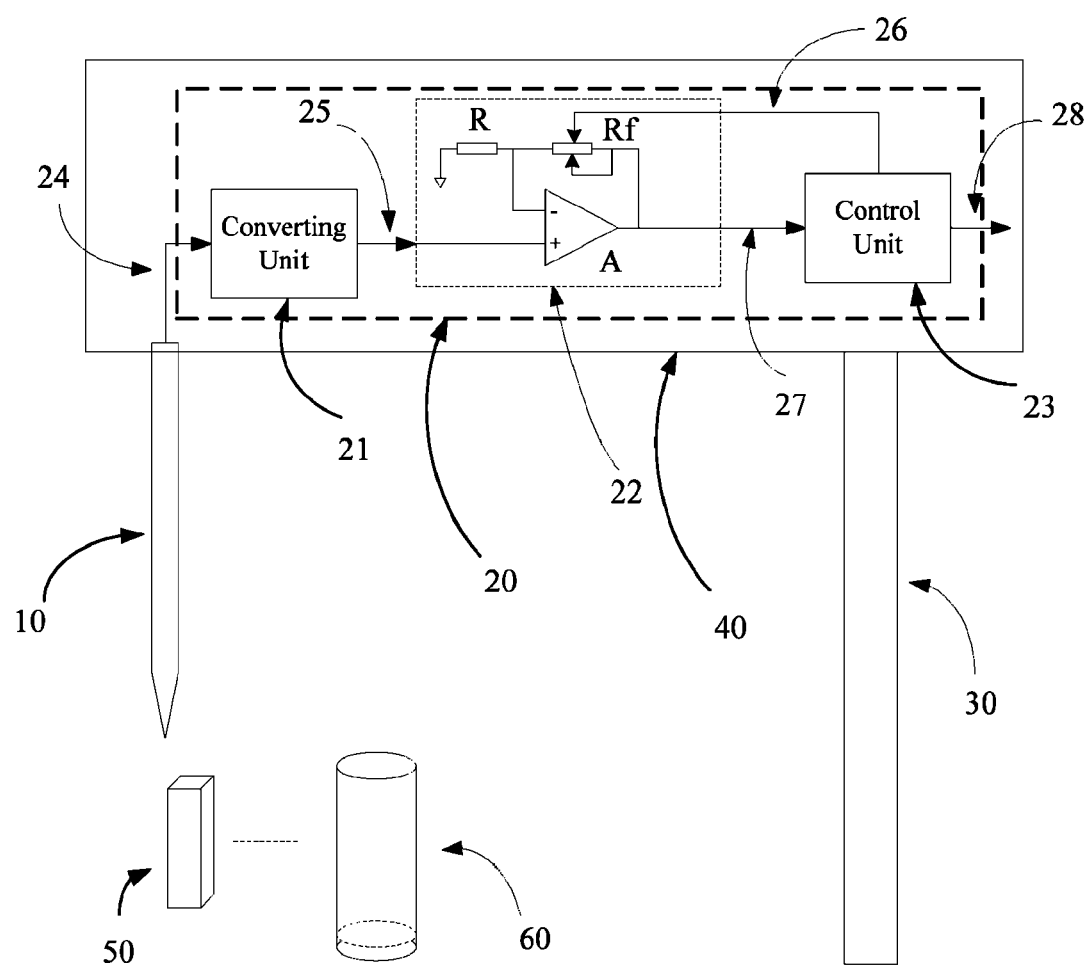
FIG. 1 illustrates a circuit diagram of an embodiment of a liquid level detection device.

Referring to FIG. 1 which illustrates an exemplary implementation of a sample applying system in some embodiments where the sample applying system includes a sampling needle 10 and a liquid level detecting device 20.

In these embodiments, the sampling needle 10 is configured to detect a liquid level or the liquid surface and causes a change in the capacitance value after the sampling needle 10 contacts the liquid surface. In these embodiments or in some other embodiments, a double-contained tube structure may be utilized for the sampling needle, and a capacitance may exist between the inner and outer tube of the double-contained tube structure, which may exhibit similar behavior as a capacitor. When the sampling needle contacts the liquid surface, the capacitance of the sampling needle may change. The capacitance signals or value(s) of the sampling needle may be detected via the liquid level detecting device which may further determine whether the sampling needle contacts the liquid level by monitoring the capacitance signals or values.

In some embodiments, the capacitance signal(s) or value(s) from a sampling needle may be first converted into a voltage or an electric potential. In some embodiments, converting the capacitance signal(s) or value(s) may comprise a direct conversion means or an indirect conversion means, which, for example, converts capacitance or electrical potential into electric current first and then converts the electric current into voltage or electric potential.

In a single embodiment or in some embodiments, the liquid level detecting device 20 includes a conversion unit 21, an amplification unit 22, and a control unit 23. The control unit 23 is operatively configured to control the sampling needle 10 to move to certain locations and, generate one or more corresponding control instructions to be transmitted to the amplifying unit 22 according to the information of the target location to which the sampling needle 10 needs to be moved. The amplification unit 22 adjusts the gain according to the one or more control instructions. A sample application system may be disposed at different locations with different operating conditions or environment.

For example, the sample application system may be disposed in an environment that is fully or partially enclosed in a metallic enclosure in some embodiments. In some embodiments, the reaction disc may be made entirely or partially of metal. In some embodiments, the reaction cup may be made entirely or partially of metal. All of the above may place the sampling needle in an environment which comprises, in part or in whole, metal that may interfere with the operation of the system after the sampling needle enters such an environment.

In some other embodiments, there may exist a scenario where the liquid container is made of plastic, but there exists very little liquid in the container. In these embodiments, the control unit knows to which location the sampling needle needs to be moved, and the control unit may thus control or adjust the gain of the amplification unit according to the target location to which the sampling needle is to be moved. The conversion unit 21 converts the capacitance signals outputted by the sampling needle 10 into corresponding voltage signals.

The amplification unit 22 receives the voltage signals outputted by the conversion unit 21 and amplifies the voltage signals according to the adjusted gain factor. The control unit 23 receives the amplified voltage signals outputted by the amplification unit 22 and compares the amplified voltage signals with a voltage threshold to determine whether the sampling needle 10 contacts the liquid level. The control unit 23 may comprise a processor that is programmed for performing the data acquisition or analog-to-digital signal conversion in some embodiments. In some embodiments, the data acquisition or the analog-to-digital signal conversion may be performed by one or more separate modules.

For example, the control unit 23 may comprise a module including a sampling unit, an A/D conversion unit, and a processor in some embodiments. The control unit 23 may also be configured or programmed to determine whether the sampling needle contacts the liquid level according to the rate of change of the amplified voltage signals in some embodiments. For example, the control unit may be configured to determine whether the sampling needle contacts the liquid level by comparing the rate of change of the amplified voltage signals with a threshold.

In this embodiment, the amplification unit 22 includes an operational amplifier A and a feedback module. The feedback module may be configured to feedback the signals at the output terminal(s) of the operational amplifier A to the inverse input terminal thereof in some embodiments. The gain of the operational amplifier A is associated with and dependent at least in part upon the impedance of the feedback module in these embodiments.

The operational amplifier A and the feedback module may jointly amplify the input signals in some embodiments. In these embodiments, the operational amplifier A employs a common mode input configuration, and the feedback module includes a feedback resistor Rf. The voltage signals outputted by the conversion unit 21 are transmitted to the common mode input terminal of the operational amplifier A. Feedback signals at the output terminal of the operational amplifier A are transmitted to the inverse input terminal thereof through the feedback resistor Rf and the resistor R and hence introduce a negative feedback.

In order to adjust the gain of the operational amplifier A in some embodiments, the output terminals of the feedback module may be connected to the control unit 23, and the control unit outputs a corresponding control signal to the feedback module according to some environmental information concerning the location where the sampling needle 10 is located or the environment within which the system operates. The control unit 23 may then be configured to adjust one or more characteristics of the feedback signals, such as the impedance, based at least in part upon one or more control instructions.

In these embodiments, the feedback resistor Rf comprises a digital or analog potentiometer whose control end receives one or more control instructions outputted by the control unit 23 to control the potentiometer and hence provides feedback impedance/resistance or voltage for the operational amplifier A.

In some embodiments, the feedback resistor Rf may be replaced with or paired with one or more capacitive or inductive elements. Alternatively, the feedback resistor Rf may also form a feedback impedance with a capacitive or inductive element in series, in parallel, or any combination thereof to implement the feedback module of the operational amplifier.

Figure 2:
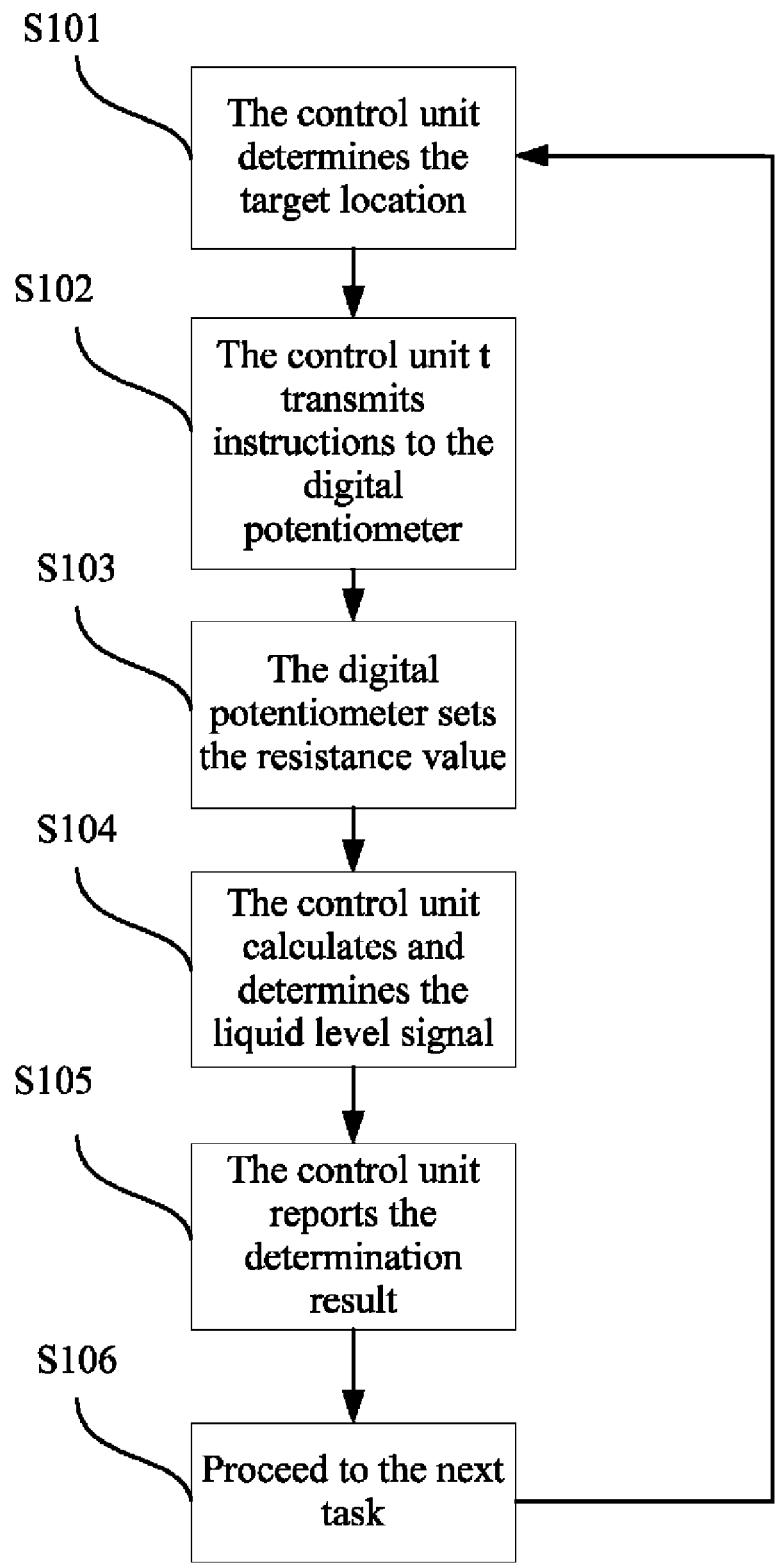
FIG. 2 illustrates a flow chart of an embodiment of a liquid level detection device.

Various embodiments also encompass a method of detecting liquid level with the liquid level detecting device which is shown in FIG. 2 and includes the following process.

At S101, before the sampling needle moves to the target location, the control unit determines a target location to which the sampling needle needs to move according to one or more presets or user's instructions. Each target location corresponds to certain environmental information which may include location information in some embodiments. The control unit proceeds to S102 after determining the environment information and transmits one or more control instructions to the potentiometer. The environment information includes, for example but not limited to, location information corresponding to the location where the sampling needle is located. The process then proceeds to S103.

At S103, the potentiometer sets the resistance or voltage value as required after receiving the one or more control instructions in some embodiments. For example, the potentiometer may be configured to adjust the gain of the amplifying circuit The method then proceeds to S104 in some embodiments.

At S104, after setting the resistance or voltage values, the sampling needle is caused to perform the detection at the designated location again in some embodiments. The needle capacitance change generated by the sampling needle may be processed to obtain a corresponding voltage change under the condition of the adjusted gain. Then the control unit compares the amplified voltage with a preset voltage threshold to determine whether the sampling needle detects the liquid level. The process then proceeds to S105 in the single embodiment or in some embodiments.

At S105, the control unit reports its determination result. S106 is carried out to implement the next task such as controlling the sampling needle for the next action such as sample suction or pipeting.

The digital potentiometer setting may then adjusted according to at least the aforementioned actions as required or desired to realize adaptation to various detection environments.

The operation of the liquid level detecting device will hereinafter be explained within various detection environments in the single embodiment or in some embodiments.

For features of various detection environments required by the system, as shown in FIG. 1, such as in a reaction cup 50 that is enclosed in part or in whole by metal or within a container 60 with a very small liquid dead volume in the single embodiment or in some embodiments. In the single embodiment or in some embodiments, a dead volume constitutes a liquid volume which a system may detect normally. In the single embodiment or in some embodiments, a dead volume constitutes a volume within a system at or below which the system may not guarantee consistent detection of its level or volume or may not consistently perform the suction or pipeting operation. For example, a system may exhibit a dead volume to be 50 µl and a single suction or pipeting amount required by the system is 10 µl, then for a sample amount above 60 µl, the system may consistently support normal tasks, whereas for a sample amount at or below 60 µl, the system may not ensure that the test result is consistent.

The control unit 23 transmits a gain control signal 26 to the amplifying unit 22 to set, for example, the resistance value of a digital potentiometer Rf, hence determining the circuit gain under this condition in the single embodiment or in some embodiments. After setting the appropriate gain control, the sampling needle 10 moves to the target location to carry out a task. A conversion unit 21 converts, for example, the capacitance change induced by the sampling needle 10 into a voltage change 25 and outputs the voltage change. After the voltage change is processed by a gain controllable amplifying unit 22, an analog signal 27 to be analyzed is obtained, and the system may finally determine whether the liquid level is detected through analysis and determination by the control unit 23 based at least in part upon the analog signal 27, and may optionally report a result of the analysis and determination result 28.

In the single embodiment or in some embodiments, it may be advantage or desirable that the sampling needle does not indicate detection of liquid or liquid level when there is in fact no liquid in the reaction cup that may be made of, for example, some metal material. Because the sampling needle is susceptible to interference caused by some metallic environment in which the needle capacitance may change due to the environment so as to affect the accuracy of detection, the gain needs to be lowered in the single embodiment or in some embodiments to reduce the voltage change corresponding to the needle capacitance change caused by the interference from the environment. In these embodiments, the aforementioned requirements may be satisfied if the control unit sets, for example, the resistance value of the digital potentiometer as 0.32 times the total resistance value which corresponds to a gain of about 4.1. At the same time, the dead volume for various samples required by the system is very small, e.g. 20 µl for a container of a particular shape. In these embodiments, the gain needs to be increased to amplify the voltage change corresponding to the capacitance change caused by the environment interference, and the requirements may also be satisfied if the resistance value of the digital potentiometer is set as, for example, 0.85 times the total resistance value, which corresponds to a gain of about 11. For other detection environments required by the system, the same method may be applied where the gain control may vary according to the different environments.

In the aforementioned detection process, the detection location and environment may be determined according to at least various different system designs or corresponding circuit gains for respective locations in various embodiments. In the single embodiment or in some embodiments, the resistance values of a digital potentiometer may be obtained by direct measurements and/or calculations or simulations and may be adjusted flexibly as desired.

In the single embodiment or in some embodiments, the gain adjustment of the operational amplifier may be implemented by using at least a digital potentiometer, and the adaptation to various detection environments or various detection locations may be realized by adjusting the gain of the detection signals, hence considering both the sensitivity and the reliability.

In some other embodiments, as shown in FIG. 1, the sample application system further includes a rocking arm 40 fixedly attached to a rocking lever 30. The rocking lever 30 may move exhibit vertical, horizontal, or rotational (such as pivoting about an axis) movements in some embodiments. The rocking arm 40 may be driven by the rocking lever 30 to move vertically and to rotate horizontally. The sampling needle 10 may be arranged on the rocking arm 40 and may be driven by the rocking arm 40 to move to the target location. The liquid level detecting device 20 is provided in a cavity of the rocking arm 40 to protect the circuitry and to connect the circuitry or the liquid level detecting device 20 to the sampling needle. An interconnecting wire between the sampling needle 10 and the liquid level detecting device 20 may be used avoid undesired disturbance, interference, and/or distortion in some embodiments. For example, a shielded wire or cable or other forms of insulating a wire from external interference may be used to avoid such disturbance, interference, and/or distortion.

Figure 3:
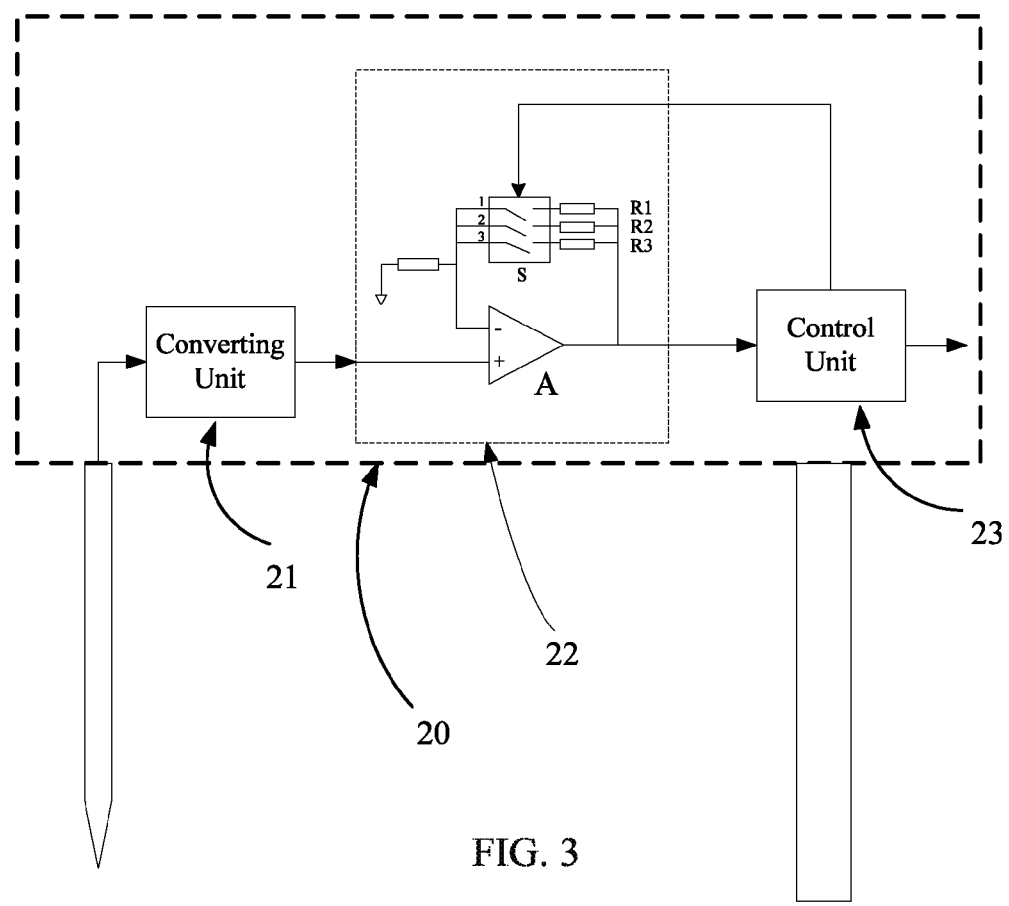
FIG. 3 illustrates a circuit diagram of another embodiment of a liquid level detection device.

In some embodiments, the system may further comprise a feedback circuit for the operational amplifier A. For example, in the embodiments shown in FIG. 3, the feedback circuit includes an analog multi-channel switch S that is serially connected between the output terminal and the inverse input terminal of the operational amplifier A. The feedback circuit may further comprise a plurality of resistors that are serially connected to each channel FIG. 3 illustrates an exemplary configuration that comprises three channels of switches, each of which is connected to a resistor—resistor R1, R2, and R3. The control end of the analog multi-channel switch S is connected with the output terminal of the control unit 23 to switch among the multiple resistors, such as resistor R1, R2, and R3, according to control instructions. In these embodiments, the analog multi-channel switch S may be connected with an inverse input terminal of the operational amplifier A, and the resistors are connected with the output terminal of the operational amplifier A as illustratively shown in FIG. 3.

In some other embodiments, the analog multi-channel switch S may be connected with the output terminal of the operational amplifier A, and the resistors may be connected with an inverse input terminal of the operational amplifier A.

The resistance values of the resistors R1, R2 and R3 may be designed as required.

Figure 4:
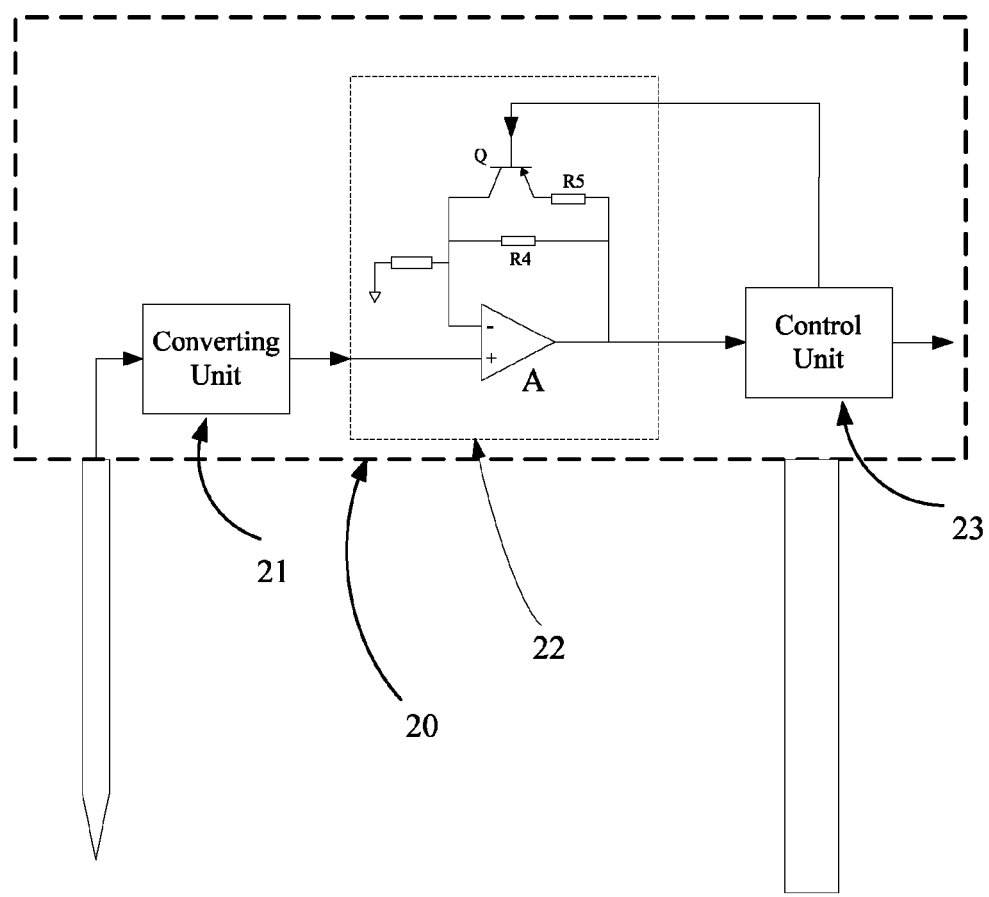
FIG. 4 illustrates a circuit diagram of yet another embodiment of a liquid level detection device.

In some embodiments as shown in FIG. 4, the feedback circuit includes at least one semiconductor switch Q that is serially connected between an output terminal and an inverse input terminal of the operational amplifier A, and a resistor R5 that is serially connected to the semiconductor switch Q. The control terminal of the semiconductor switch Q is connected with the output terminal of the control unit 23 to switch between on and off states according to the control signals in order to control whether resistor R5 is connected to the feedback circuit, hence adjusting the gain of the amplifying unit.

In these embodiments, the series circuit consisting of the semiconductor switch Q and the resistor R5 may also be connected in parallel with the resistor R between an output terminal and an inverse input terminal of the operational amplifier A. The resistance values may be modulated by, for example, controlling on and off states of the semiconductor switch Q. For example, the switch may be open to connect another resistor in parallel with the original resistor, hence lowering the resistance.

Those skilled in the art may design the connection between the semiconductor switch Q and peripheral circuits based at least in part on the type of the selected semiconductor switch Q.

The feedback circuit in some embodiments may include a plurality of switching circuits in parallel.

In the single embodiment or in some embodiments, the operational amplifier may also apply an inverse input configuration according to practical situations. The operational amplifier may also be replaced with other amplifying elements such as a transistor in some embodiments. In these embodiments, the amplifying unit includes an amplifier and one or more peripheral circuits, and any one resistor in the peripheral circuits that may influence the magnification functions of the amplifier may be selected as a varistor. The varistor may be controlled by the control unit and may regulate or modulate the resistance as desired.

In the aforementioned embodiments, there may exist different conditions for different detection locations. There may also exist different conditions even for the same location at different times. For example, the temperature or humidity may fluctuate to affect the detection because different temperature or humidity may exert different influence on, for example, the capacitance change of the sampling needle. In order for the liquid level detecting device to adapt to different temperatures or humidity, in the single embodiment or in some embodiments, the liquid level detecting device may further include a temperature sensor and/or a humidity sensor.

The output terminal of the temperature sensor or the humidity sensor may be operatively coupled to the control unit that outputs control signals to the amplifying unit for adjusting the gain of the amplifying unit according to at least the temperature information detected by the temperature sensor. In these embodiments, the environmental information based at least in part on which the control signals are generated includes temperature information, and the control signals include at least one parameter corresponding to the temperature detected by the temperature sensor. The control unit may also generate control signals according to both the location information and the temperature information in some embodiments. In these embodiments, the environmental information includes location information and temperature information, and the amplifying unit adjusts the gain according to at least the location of the sampling needle and the current environmental temperature.

In these embodiment or in some other embodiments, the liquid level detecting device may also include a humidity sensor. In these embodiments, the output terminal of the humidity sensor is coupled to the control unit that outputs control signals to the amplifying unit for adjusting the gain of the amplifying unit according to the humidity information detected by the humidity sensor. In these embodiments, the environmental information based at least in part on which the control signals are generated includes humidity information, and the control signals include a parameter corresponding to the humidity detected by the humidity sensor. The control unit may also generate control signals according to both the location information and the humidity information in some embodiments. In these embodiments, the environmental information includes location information and humidity information, and the amplifying unit adjusts the gain according to the location of the sampling needle and the environmental humidity.

Those skilled in the art clearly understand that the environmental information include location information, temperature information, and humidity information, and the amplifying unit adjusts the gain according to the location of the sampling needle and the environmental temperature and humidity.

In some other embodiments, the liquid level detecting device adapts to the environment in which the sampling needle is situated by means of a process for adjusting the gain and changing, for example, the voltage threshold. In these embodiments, the control unit may select a more appropriate preset voltage threshold according to at least the environmental information. The liquid level detecting device amplifies the voltage with the adjusted gain and compares the amplified voltage with the voltage threshold selected according to the environmental information to determine whether the sampling needle detects the liquid level. In these embodiments, the control unit may not only control the gain but also control determination conditions such as the voltage threshold. Comprehensive control over both gains and determination conditions may render the liquid level detecting device more flexible to consider both sensitivity and reliability for realizing the self adaptation feature of the liquid level detecting device in various embodiments.

During the process of detecting the liquid level, different locations and different environments may have different requirements for detection. To consider both sensitivity and reliability of a detecting system, mutually independent circuit parameters may be designed for each specific location and stored at a central location such as any computer readable memory so that the mutually independent circuit parameters may be selected by the device with, for example, commands through user interfaces or application programming interfaces, which enables the overall system to satisfy various requirements and extends the number of locations to which it adapts.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions or a particular arrangement of certain hardware devices or modules. Nonetheless, the ordering of many of the described process actions and the arrangement of many of the described hardware modules or device may be changed without affecting the scope or operation of the invention. The specification and drawings are, accordingly, to be regarded in an illustrative rather than restrictive sense.

We claim:

1. A liquid level detecting device, comprising:
   a control unit to output one or more control signals corresponding to environmental information that corresponds to where a sampling needle is located in the liquid level detecting device;
   an amplifying unit that comprises a feedback circuit that is to set a gain according to the one or more control signals, wherein
      the feedback circuit comprises:
         a switch, which switches among multiple states or among multiple connections based at least in part upon the one or more control signals and is connected to an output terminal and an inverse input terminal in the amplifying unit,
         a control terminal, which is connected to an output terminal of the control unit, to transmit a feedback signal to the inverse input terminal of the amplifying unit, and
         a feedback impedance element connected between the output terminal and the inverse input terminal of the amplifying unit and comprising at least one of a digital or analog potentiometer, a variable capacitor, and a variable inductor to control an impedance value according to the one or more control signals;
   a conversion unit to receive an electrical signal outputted by the sampling needle and output a corresponding electrical signal after conversion, wherein
      the amplifying unit is to receive the electrical signal and amplify the electrical signal according to the gain to output the corresponding electrical signal, and
      the control unit is to receive the corresponding electrical signal and determine whether the sampling needle contacts a liquid level based at least in part upon the corresponding electrical signal.

2. The liquid level detecting device of claim 1, wherein the amplifying unit comprises an amplifier and the feedback circuit that is configured for to transmit one or more signals at the output terminal of the amplifier to the inverse input terminal thereof, and the feedback circuit is connected to the output terminal of the control unit to receive the one or more control signals and to adjust the feedback signal according to the one or more control signals.

3. The liquid level detecting device of claim 2, wherein the feedback circuit comprises the feedback impedance element that is serially connected between the output terminal and the inverse input terminal of the amplifier.

4. The liquid level detecting device of claim 2, wherein the feedback circuit comprises an analog multi-channel switch, which is serially connected between the output terminal and the inverse input terminal in the amplifying unit, and a resistor, which is serially connected to each channel of the analog multi-channel switch, wherein a control terminal of the analog multi-channel switch is connected to the output terminal of the control unit to switch among a plurality of resistors based at least in part upon the one or more control signals.

5. The liquid level detecting device of claim 2, wherein the feedback circuit comprises at least one semiconductor switch, which is serially connected between the output terminal and the inverse input terminal of the amplifying unit, and a resistor, which is serially connected to the semiconductor switch, wherein a control terminal of the semiconductor switch is connected to the output terminal of the control unit to switch between on and off states based at least in part upon the one or more control signals.

6. The liquid level detecting device of claim 1, wherein the environmental information comprises at least one of location information, temperature information, and humidity information of a location of the sampling needle.

7. The liquid level detecting device of claim 6, wherein the liquid level detecting device further comprises a temperature sensor, which comprises an output terminal that is coupled to the control unit, or a humidity sensor, which comprises an output terminal that is coupled to the control unit.

8. The liquid level detecting device of claim 1, wherein the control unit selects a corresponding threshold according to the environmental information and compares the corresponding electrical signal with the corresponding threshold to determine whether the sampling needle contacts the liquid level.

9. A method for detecting liquid level, comprising:
   determine or identifying an environment in which a sampling needle is located;
   determining or identifying, by using an amplifying unit that comprises a feedback circuit, a gain according to environmental information of the environment, in which the act of determining or identifying the gain comprises:
      transmitting a control signal from an output terminal of a control unit to a switch control terminal of a switch in the feedback circuit to adjust a feedback signal;
      controlling an impedance value based at least in part upon the control signal by using at least a feedback impedance element, which comprises at least one of a digital or analog potentiometer, a variable capacitor, and a variable inductor and is connected between an output terminal and an amplifier inverse input terminal of the amplifying unit;
      transmitting, by using the feedback circuit, the feedback signal to the amplifier inverse input terminal; and switching, by using the switch that is connected between the output terminal and an lithe amplifier inverse input terminal, among multiple states or among multiple connections based at least in part upon the control signal;

amplifying a liquid level signal from the sampling needle based at least in part upon the gain; and determine whether the sampling needle contacts the liquid level based at least in part upon a corresponding liquid level signal.

10. The liquid level detecting method of claim 9, wherein the act of determining or identifying the gain is performed by adjusting at least an impedance of a feedback circuit of the amplifying unit.

11. A sample application system, comprising:
a sampling needle,
a liquid level detecting device which comprises:
  a control unit to output one or more control signals corresponding to environmental information that corresponds to where the sampling needle is located in the liquid level detecting device;
  an amplifying unit that comprises a feedback circuit and is to set a gain according to the one or more control signals, wherein
    the feedback circuit comprises:
      a switch, which switches among multiple states or among multiple connections based at least in part upon the one or more control signals and is connected to an output terminal and an inverse input terminal in the amplifying unit,
      a control terminal, which is connected to an output terminal of the control unit, to transmit one or more signals from the output terminal to the inverse input terminal; and
      a feedback impedance element connected between the output terminal and the inverse input terminal of the amplifying unit and comprising at least one of a digital or analog potentiometer, a variable capacitor, and a variable inductor to control an impedance value according to the one or more control signals; and
  a conversion unit to receive an electrical signal outputted by the sampling needle and output a corresponding electrical signal after conversion, wherein
    the amplifying unit is to receive the electrical signal and amplify the electrical signal according to the gain to output the corresponding electrical signal, and
    the control unit is to receive the corresponding electrical signal and determine whether the sampling needle contacts a liquid level based at least in part upon the corresponding signal, and
    the conversion unit is operatively connected to the sampling needle.

12. The sample applying system of claim 11, wherein the sample application system further comprises a rocking arm to which the sampling needle is attached, and the liquid level detecting device comprises a cavity for accommodating the rocking arm.

13. The sample applying system of claim 11, wherein the amplifying unit comprises an amplifier and a feedback circuit that is to transmit one or more signals at the output terminal in the amplifying unit to an inverse input terminal thereof, and the feedback circuit is connected to the output terminal of the control unit to receive the one or more control signals and to adjust a feedback signal according to the one or more control signals.

14. The sample applying system of claim 13, wherein the feedback circuit comprises the feedback impedance element that is serially connected between the output terminal and the inverse input terminal in the amplifying unit.

15. The sample applying system of claim 13, wherein the switch in the feedback circuit comprises an analog multi-channel switch, which is serially connected between the output terminal and the inverse input terminal of the amplifying unit, a resistor, which is serially connected to each channel of the analog multi-channel switch, wherein a control terminal of the analog multi-channel switch is connected to the output terminal of the control unit to switch among a plurality of resistors based at least in part upon the one or more control signals.

16. The sample applying system of claim 13, wherein the feedback circuit comprises at least one semiconductor switch, which is serially connected between the output terminal and the inverse input terminal of the amplifying unit, and a resistor, which is serially connected to the semiconductor switch, wherein a control terminal of the semiconductor switch is connected to the output terminal of the control unit to switch between on and off states based at least in part upon the one or more control signals.

17. A liquid level detecting device, comprising:
a control unit to output one or more control signals corresponding to environmental information according to a location of a sampling needle;
an amplifying unit to set a gain according to the one or more control signals; and
a conversion unit to receive an electrical signal outputted by the sampling needle and output a corresponding electrical signal after conversion, wherein
  the amplifying unit comprises an amplifier and a feedback circuit that is to transmit one or more signals at an output terminal of the amplifier to an inverse input terminal thereof,
  the feedback circuit is connected to an output terminal of the control unit to receive the one or more control signals and to adjust a feedback signal based at least in part the one or more control signals, in which
    the feedback circuit comprises a feedback impedance element that is connected between the output terminal and the inverse input terminal of the amplifier and comprises at least one of a digital or analog potentiometer, a variable capacitor, and a variable inductor to control an impedance value according to the one or more control signals,
    the feedback circuit comprises a switch, which is connected between the output terminal and the inverse input terminal of the amplifier, a resistor connected to the switch, and a control terminal connected to the output terminal of the control unit to switch among multiple states or among multiple connections based at least in part upon the one or more control signals,
    the switch switches among the multiple states or the multiple connections and comprises an analog multi-channel switch or a semiconductor switch,
  the amplifying unit is to receive the electrical signal and amplify the electrical signal according to the gain to output the corresponding electrical signal, and
  the control unit is to receive the corresponding electrical signal and determine whether the sampling needle contacts a liquid level based at least in part upon the corresponding signal.

18. The liquid level detecting device of claim 17, wherein the environmental information comprises at least one of location information, temperature information, and humidity information of a location of the sampling needle.

19. The liquid level detecting device of claim 18, wherein the liquid level detecting device further comprises a temperature sensor, which comprises an output terminal that is coupled to the control unit, or a humidity sensor, which comprises an output terminal that is coupled to the control unit.

20. The liquid level detecting device of claim 17, wherein the control unit selects a corresponding threshold according to the environmental information and compares the corresponding electrical signal with the corresponding threshold to determine whether the sampling needle contacts the liquid level.

* * * * *